(12) United States Patent
Norden

(10) Patent No.: US 11,194,663 B2
(45) Date of Patent: Dec. 7, 2021

(54) PROTOCOL FOR IMPROVING REBUILD TIMES OF REDUNDANT ARRAY OF INDEPENDENT DISKS

(71) Applicant: DigitalOcean, LLC, New York, NY (US)

(72) Inventor: Hahn Norden, Austin, TX (US)

(73) Assignee: DigitalOcean, LLC, New York, NY (US)

( * ) Notice: Subject to any disclaimer, the term of this patent is extended or adjusted under 35 U.S.C. 154(b) by 41 days.

(21) Appl. No.: 16/577,343

(22) Filed: Sep. 20, 2019

(65) Prior Publication Data

US 2021/0089399 A1    Mar. 25, 2021

(51) Int. Cl.
*G06F 11/10* (2006.01)
(52) U.S. Cl.
CPC ...... *G06F 11/1092* (2013.01); *G06F 11/1088* (2013.01)
(58) Field of Classification Search
CPC .......................... G06F 11/1088; G06F 11/1092
USPC ................................................. 714/6.22–6.32
See application file for complete search history.

(56) References Cited

U.S. PATENT DOCUMENTS

| | | | | |
|---|---|---|---|---|
| 6,467,048 | B1 * | 10/2002 | Olarig | G11C 29/70 714/54 |
| 6,601,132 | B2 * | 7/2003 | Nomura | G11C 16/3454 365/185.09 |
| 6,647,514 | B1 * | 11/2003 | Umberger | G06F 11/1092 714/42 |
| 8,725,940 | B2 * | 5/2014 | Grube | G06F 3/0685 711/114 |
| 8,726,070 | B2 * | 5/2014 | Nelogal | G06F 11/1092 714/6.22 |
| 8,751,861 | B2 * | 6/2014 | Nair | G06F 3/0613 714/6.21 |
| 9,378,093 | B2 * | 6/2016 | Cooper | G06F 11/1092 |
| 10,929,229 | B2 * | 2/2021 | Stoica | G06F 3/0689 |
| 2014/0075240 | A1 * | 3/2014 | Maeda | G06F 11/2069 714/6.23 |
| 2018/0101450 | A1 * | 4/2018 | Park | G06F 11/1662 |
| 2019/0258546 | A1 * | 8/2019 | Volvovski | G06F 16/2379 |

* cited by examiner

*Primary Examiner* — Joseph R Kudirka
(74) *Attorney, Agent, or Firm* — Meister Seelig & Fein LLP; Seth H. Ostrow, Esq.

(57) ABSTRACT

A method and system for rebuilding a Redundant Array of Independent Disks ("RAID"), the system comprising a RAID engine comprising one or more processing devices that facilitate packet communications with a plurality of storage devices, the packet communications including Read/Write-Rebuild opcodes and settings that prioritize read and write requests associated with a RAID rebuild of the plurality of storage devices, the Read/Write-Rebuild opcodes including rebuild input/output ("IO") read requests that read good portions of data and parity information from a set of the plurality of storage devices, and rebuild IO write requests that write data to a new one of the plurality storage devices wherein the written data includes data that is reconstructed by the RAID engine based on the data and the parity information.

20 Claims, 5 Drawing Sheets

PROTOCOL FOR IMPROVING REBUILD TIMES OF REDUNDANT ARRAY OF INDEPENDENT DISKS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to improving performance of redundant array of independent disks when undergoing a rebuild process.

Description of the Related Art

RAID, an acronym for "Redundant Array of Independent Disks" or "Redundant Array of Inexpensive Disks" may refer to a storage technology that virtualizes multiple, independent storage drives into one or more arrays to improve performance, capacity, reliability, and redundancy. A RAID may be created by combining multiple disk drives (or other storage components, such as solid-state drives) into a logical unit. Data may then be distributed across the drives using various techniques, referred to as "RAID levels." RAID levels may include configurations that employ techniques including striping, mirroring, and/or parity to provide data redundancy. When a disk drive of a RAID fails, the RAID may be rebuilt to restore data redundancy. This may be accomplished by replacing or repairing the failed disk drive and copying and/or regenerating the lost data by using parity data.

When a RAID is being rebuilt, a RAID controller typically utilizes bandwidth and/or processing resources to reconstruct the lost data. In many cases, the RAID controller must also continue to process read and write operations. As a result, both the rebuild time and the read/write response time are negatively impacted due to the competition for resources. If more resources are dedicated to rebuilding the RAID, input/output ("I/O") performance suffers. If more resources are dedicated to servicing I/O requests, the rebuild time is extended. A longer rebuild time increases the probability that another disk drive will fail which may result in permanent data loss or RAID failure. As such, it is ideal to rebuild the RAID as expeditiously to prevent RAID failure while also maintaining adequate I/O performance. In a hosted platform and cloud provider market, system failure and down time translate to both costs due to service level agreement violation ("SLA") and costs in lost opportunities where SLA can not be sold.

There is thus a need to minimize the impact on both I/O performance and rebuild time to improve the performance of RAIDs during a rebuild process.

SUMMARY OF THE INVENTION

The present invention provides a method and system for rebuilding a Redundant Array of Independent Disks ("RAID"). According to one embodiment, the system comprises a RAID engine comprising one or more processing devices that facilitate packet communications with a plurality of storage devices, the packet communications including Read/Write-Rebuild opcodes and settings that prioritize read and write requests associated with a RAID rebuild of the plurality of storage devices, the Read/Write-Rebuild opcodes including rebuild input/output ("IO") read requests that read good portions of data and parity information from a set of the plurality of storage devices, and rebuild IO write requests that write data to a new one of the plurality storage devices wherein the data includes data that is reconstructed by the RAID engine based on the data and the parity information.

The Read/Write-Rebuild opcodes may further include memory read request for the rebuild and memory write request for the rebuild. The plurality of storage devices may be configured as a single logical device and includes a volume of data that is stored across the plurality of storage devices. The RAID engine may further reconstruct the data by performing exclusive or ("XOR") computations on the data and the parity information. In one embodiment, the RAID engine may further retrieve data requested from a given one that is not from the set and determine that the requested data includes errors based on a comparison with the parity information. The RAID engine may also rebuild the requested data with the data written to the new one of the plurality of storage devices. The set may comprise unfailed ones of the plurality of storage devices.

According to another embodiment, the system comprises one or more servers coupled to a storage controller; the storage controller comprising one or more processing devices that facilitate packet communications with a plurality of storage devices, the packet communications including Read/Write-Rebuild opcodes and settings that prioritize read and write requests associated with a RAID rebuild of the plurality of storage devices, the Read/Write-Rebuild opcodes including rebuild input/output ("IO") read requests that read good portions of data and parity information from a set of the plurality of storage devices, and rebuild IO write requests that write data to a new one of the plurality storage devices wherein the written data includes data that is reconstructed by the RAID engine based on the data and the parity information.

The Read/Write-Rebuild opcodes may further include memory read request for the rebuild and memory write request for the rebuild. The storage controller may further reconstruct the data by performing exclusive or ("XOR") computations on the good portions of data and the parity information.

According to another aspect of the present invention, method is provided for detecting and repairing drives in a Redundant Array of Independent Disks ("RAID") storage system. The method comprising determining operating conditions of a plurality of drives by sending transaction requests to the plurality of drives, identifying expected acknowledgement and responses are not returned by a given one of a plurality of drives in response to the transaction requests, determining the given one of the plurality of drives has failed based on the identification, determining that the failed drive has been replaced with a new drive, triggering a RAID rebuild, issuing Read-Rebuild opcode that reads data and parity information from remaining ones of the plurality of drives in response to the RAID rebuild, calculating data that was stored on the failed drive prior to failure based on the data and parity information from the remaining ones of the plurality of drives, and issuing Write-Rebuild opcode that writes the calculated data to the new drive.

The Read-Rebuild opcode may include a prioritized input/output ("I/O") read request of data from the remaining ones of the plurality of drives that takes precedence over I/O read and write requests that are not associated with the RAID rebuild. The Read-Rebuild opcode may also include a prioritized memory write of the data read from the good drives to memory that takes precedence over memory read and write requests that are not associated with the RAID rebuild. Calculating the data may include calculating a XOR operation on the data and parity information from the remaining ones of the plurality of drives. The Write-Rebuild opcode may include a prioritized I/O write request of the calculated data to the new drive that takes precedence over I/O read and write requests that are not associated with the RAID rebuild. The Write-Rebuild opcode may also include a prioritized memory read of the calculated data that takes precedence over memory read and write requests that are not associated with the RAID rebuild.

The method may further comprise retrying the transaction requests a preset number of times. A register bit or graphical user interface flag may be set to notify a user that the given one of the plurality of drives has failed. A presence detect pin at a drive slot associated with the failed drive may be determined to be toggled. The method may further comprise setting a register bit or graphical user interface flag that notifies a user that the presence detect pin has been toggled.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Figure 1:
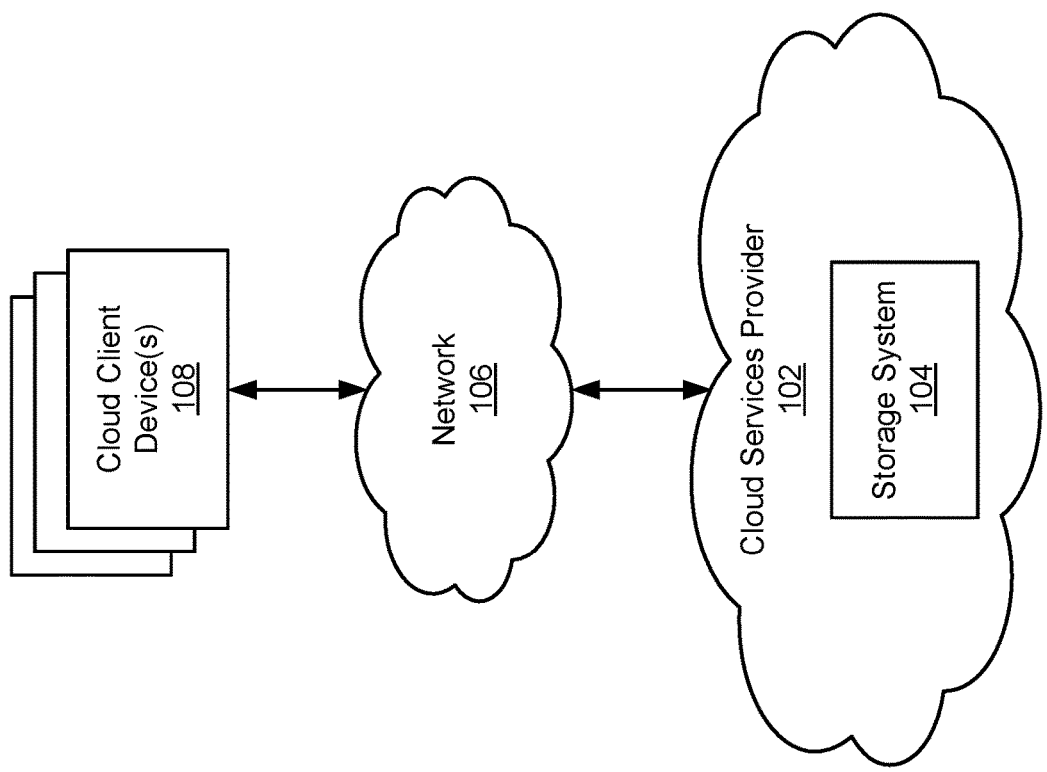
FIG. 1 illustrates a computing system according to an embodiment of the present invention.

FIG. 1 presents a computing system according to an embodiment of the present invention. The system may comprise cloud services provider 102 including a storage system 104. Cloud services provider 102 may include a server or at least a special-purpose digital computing device including at least one or more central processing units and memory. The cloud services provider 102 may also include or have access to memory for storing instructions or applications for the performance of various functions and a corresponding processor for executing stored instructions or applications with respect to storage system 104. For example, the memory may store an instance of a server configured to operate in accordance with the disclosed embodiments.

Cloud services provider 102 may be coupled to cloud client device(s) 108 via a network 106. Network 106 may be any suitable type of network allowing transport of data communications across thereof. The network 106 may couple devices so that communications may be exchanged, such as between the cloud services provider 102 and cloud client device(s) 108. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. In such an example, digital information may be exchanged between the cloud services provider 102 and cloud client device(s) 108 via the network 106 using one or more data communications protocols.

Cloud client device(s) 108 may comprise computing devices (e.g., desktop computers, terminals, laptops, personal digital assistants (PDA), cellular phones, smartphones, tablet computers, or any computing device having a central processing unit and memory unit capable of connecting to a network) that can be configured to access cloud computing resources or applications from cloud services provider 102. Cloud client devices may also comprise a graphical user interface (GUI) or a browser application provided on a display (e.g., monitor screen, LCD or LED display, projector, etc.). A cloud client device may vary in terms of capabilities or features. For example, a cloud client device may also include or execute an application to communicate content, such as, textual content, multimedia content, or the like. A client device may also include or execute an application to perform a variety of possible tasks, such as browsing, searching, playing various forms of content, including locally stored or streamed video, or games. A client device may include or execute a variety of operating systems, including a personal computer operating system, such as a Windows, Mac OS or Linux, or a mobile operating system, such as iOS, Android, or Windows Phone, or the like.

Cloud services provider 102 may comprise a system that abstracts the use of shared resources to provide services to cloud client device 108 through network 106. For example, the cloud services provider 102 may be embodied as a system and computing environment that provides services to users (cloud client device(s) 108) of the cloud services provider 102 through the sharing of resources from storage system 104 via the network 106. The cloud services provider 102 may also provide on-demand access to a shared pool of configurable computing resources (not illustrated) such as computer networks, servers, applications and services, etc. The shared pool of configurable resources may be provisioned and released to a user of the cloud services provider 102.

The cloud services provider 102 may be configured to provide a variety of services with the storage system 104 through the implementation of various service models. For example, the cloud services provider 102 may be configured to provide services with the storage system 104 through the implementation of an infrastructure as a service ('IaaS') service model where the cloud services provider 102 may offer services such as storage, networking, and virtualization to subscribers. In addition, the cloud services provider 102 may be configured to provide services with the storage system 104 through the implementation of a platform as a service ('PaaS') service model where the cloud services provider 102 may offer a development environment to application developers. Such a development environment may include, for example, an operating system, programming-language execution environment, database, web server, or other components that may be utilized by application developers to develop and run software solutions on a cloud platform. Furthermore, the cloud services provider 102 may be configured to provide services with the storage system 104 through the implementation of a software as a service ('SaaS') service model where the cloud services provider 102 may offer application software, databases, as well as the platforms that may be used to run applications on the storage system 104 to provide on-demand software and eliminating the need to install and run the application on local computers. The cloud services provider 102 may be further configured to provide services with the storage system 104 through the implementation of an authentication as a service ('AaaS') service model where the cloud services provider 102 may offer authentication services that can be used to secure access to applications, data sources, or other resources. The cloud services provider 102 may also be configured to provide services with the storage system 104 through the implementation of a storage as a service model where the cloud services provider 102 may offer access to its storage infrastructure for use by users of the storage system 104.

Figure 2:
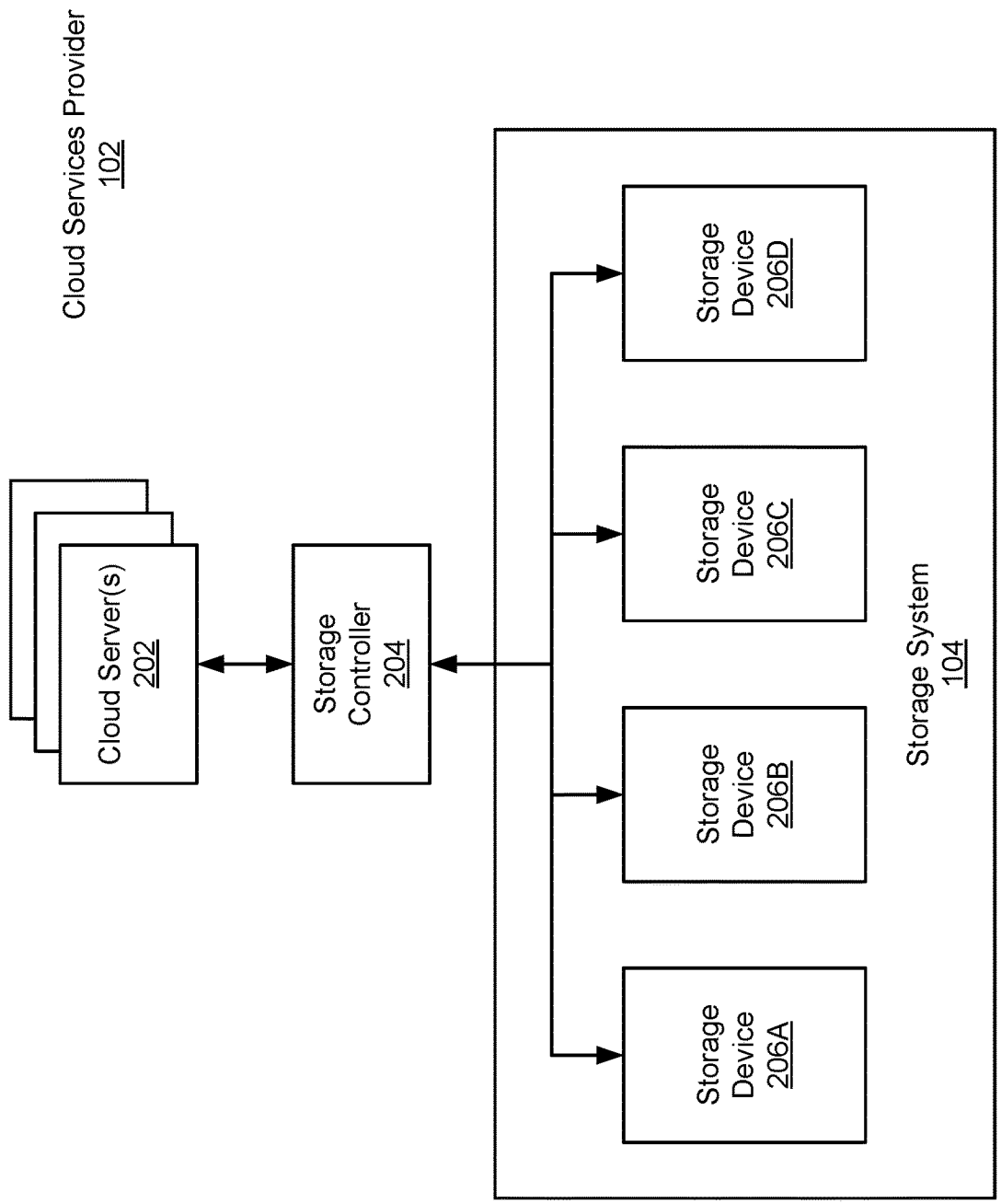
FIG. 2 illustrates a cloud services provider according to an embodiment of the present invention.

FIG. 2 presents a cloud services provider according to an embodiment of the present invention. Cloud services provider 102 may comprise cloud server(s) 202 that are coupled to storage system 104 via a storage controller 204. Cloud server(s) 202 may facilitate provisioned resources and services to cloud client device(s) 108 by accessing and using storage system 104. The storage system 104 may include an array of storage device 206A, storage device 206B, storage device 206C, and storage device 206D. The storage devices 206A-206D may comprise dedicated storage hardware, such as hard disk drives or solid-state drivers, capable of providing persistent data storage that are configured into a single RAID volume (or logical drive). The storage hardware may include support of a plurality of interface standards including Small Computer System Interface ("SCSI"), Internet SCSI, Fibre Channel ("FC"), Serial Attached SCSI ("SAS"), Integrated Drive Electronics ("IDE")/Advanced Technology Attachment ("ATA")/Parallel ATA ("PATA"), Serial ATA ("SATA") standards, ATA over Ethernet, Non-Volatile Memory Express ("NVMe"). Storage system 104 may be configured as storage area network ("SAN"), network-attached storage ("NAS"), SAN-NAS hybrid, or any other storage network configuration known by one of ordinary skill in the art.

Storage controller 204 may include an input/output ("I/O") controller or the like that couples the storage controller 204 to storage system 104 for data communications. For example, storage controller 204 may include a data communications adapter configured to support communications with storage system 104 via SAN or LAN. In some embodiments, storage controller 204 may be embedded or constructed as a component within storage system 104. The storage controller 204 may be embodied as a module of automated computing machinery comprising computer hardware, computer software, or a combination of computer hardware and software. For example, storage controller 204 may include one or more processing devices (such as a microprocessor, central processing unit, or the like) and random-access memory. The processing devices may also be one or more special-purpose processing devices such as a Field Programmable Gate Array ("FPGA"), a Programmable Logic Chip ("PLC"), an Application Specific Integrated Circuit ("ASIC"), System on-Chip ("SoC"), or any other discrete system components. The storage controller 204 may be configured to carry out various storage tasks on storage system 104. Storage tasks may include reading and writing data, monitoring and reporting of disk utilization and performance, and performing redundancy or RAID operations.

A RAID level including data striping with parity may be configured across the volume of storage devices 206A-206D in storage system 104. Data striping may refer to a technique of segmenting logically sequential data, such as a file, so that consecutive segments are stored on different physical storage devices. Striping may provide improved performance by spreading data segments across the volume of multiple storage devices which can be accessed concurrently to increase bandwidth. Parity may be calculated for the segmented data to provide data redundancy where the parity can be used to reconstruct data after a failure. For example, while data is being written to a given one of storage devices 206A-206D, parity is calculated by doing an exclusive or ("XOR") procedure on the data. The parity may be stored to given segments of the volume and if a portion of the RAID volume fails, the data in the portion of the failed volume can be recreated from the remaining data and parity information.

Figure 3A:
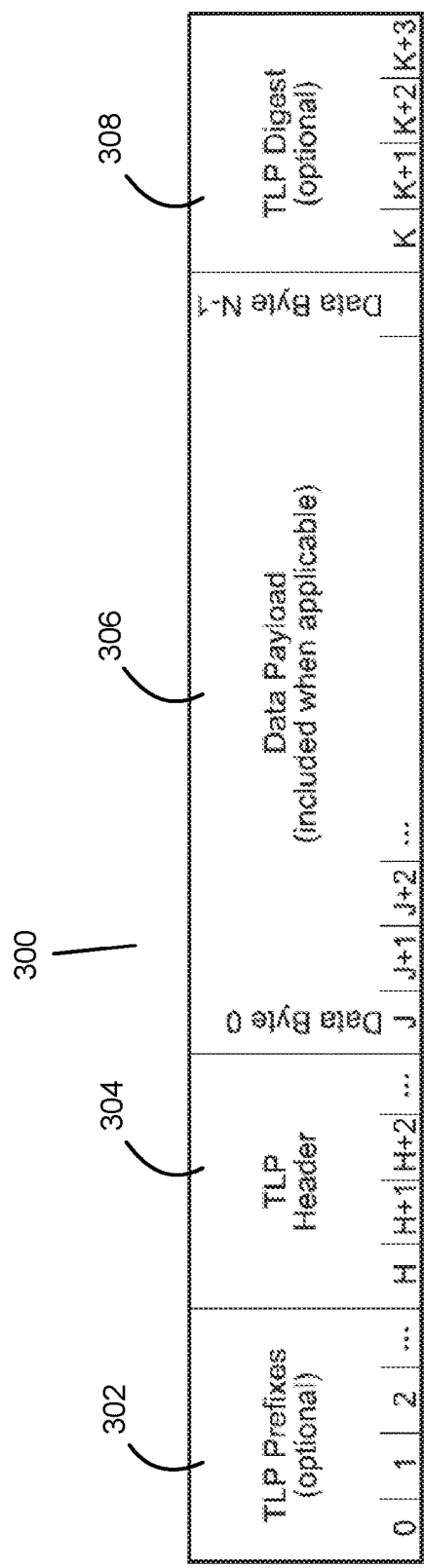
FIG. 3A illustrates a diagram of an exemplary PCI Express transaction layer packet according to an embodiment of the present invention.

Data communication among and/or between storage controller 204 and storage devices 206A-206D may be established through a communication connection or bus using PCI Express ("PCIe") communication. Communication over PCIe may implement switch-based technology using a packet-based communication protocol. FIG. 3A presents an exemplary PCIe transaction layer packet ("TLP") based on the PCI Express® Base Specification Revision 3.0. TLPs may be used to communicate transactions as well as certain types of events, between the storage controller 204 and the storage devices 206A-206D.

Figure 3B:
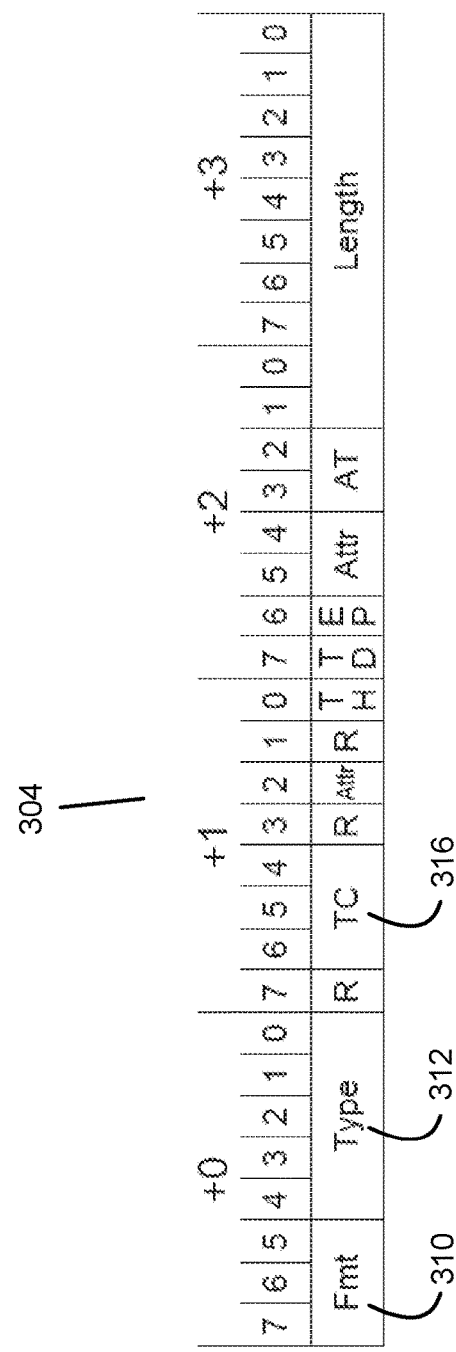
FIG. 3B illustrates a diagram of a transaction layer packet header according to an embodiment of the present invention.

PCIe TLP 300 includes a TLP prefix 302, a TLP header 304, a data payload 306, and a TLP digest 308. FIG. 3B presents a diagram of the TLP header 304 in the PCIe TLP 300 of FIG. 3A. The TLP header 304 includes a "Format" field 310 that may indicate a format of the packet and the presence of one or more TLP prefixes. The TLP header 304 may also include a "Type" field 312 that may indicate type of TLP. The Type field 312, in addition to defining the type of the TLP may also determine how the TLP is routed by a switch (e.g., storage controller 204) on the communication connection or bus. The Type field 312 may be encoded to indicate types of transactions including memory read/write transactions, I/O read/write transactions, configuration read/write transactions, and message transactions, for example. The Format 310 and Type 312 fields of the TLP header may provide the information required to determine the size of the remaining part of the TLP Header, and if the packet contains a data payload following the header. The TLP header 304 also includes a "Traffic Class" field 316 that may be used to differentiate transactions for differentiated traffic servicing. That is, the information in the Traffic Class field 316 may be used to make decisions with regards to proper servicing of the traffic.

Referring to Table 1, standard implementations of the PCIe TLP may differentiate read and write transactions based on intended destinations such as 'CfgRd' or 'CfgWr' for configuration space read or write, 'IORd' or 'IOWr' for read or write to I/O subsystems, and 'MRd' or 'MWr' for read or write to memory. Grouping read and write transactions, granted to the same destination subsystem, into a single category, e.g., I/O read/write, results in the inability to impose differentiated priorities on different subtypes (e.g., for a RAID rebuild). When a system encounters a drive failure in a RAID configuration, the replacement drive should be "rebuilt" as quickly as possible. RAID rebuild operations include reading data from good portions of storage volume and parity data from drives in the RAID, applying a RAID algorithm on read data, and writing out calculated data to a drive being rebuilt. The rebuild duration heavily depends on the bandwidth delivered to the drive.

TABLE 1

| TLP Type | Format | Type | Description |
| --- | --- | --- | --- |
| MRd | 000 | 0 0000 | Memory Read Request |
| MWr | 010 | 0 0000 | Memory Write Request |
| IORd | 000 | 0 0010 | I/O Read Request |
| IOWr | 010 | 0 0010 | I/O Write Request |
| CfgRd | 000 | 0 0100 | Configuration Read |
| CfgWr | 010 | 0 0100 | Configuration Write |

According to embodiments of the present invention, a modified PCIe TLP is disclosed which ensures the highest bandwidth for reads and writes of a RAID rebuild process. With the modified PCIe TLP, reads and writes associated with RAID rebuilding may be differentiated from normal I/O reads and writes to disk. With the ability to separate rebuild traffic, RAID rebuild reads/writes can be prioritized over standard reads/writes. As such, designation of certain fields in the TLP header 304 may be modified according to Table 2. In particular, "Read-Rebuild" and "Write-Rebuild" opcodes may be added to existing read/write types.

TABLE 2

| TLP Type | Format | Type | Description |
| --- | --- | --- | --- |
| MRd-Rebuild | 000 | 0 0101 | Memory Read Request for a Rebuild |
| MWr-Rebuild | 010 | 0 0111 | Memory Write Request for a Rebuild |
| IORd-Rebuild | 000 | 0 0101 | IO Read Request for a Rebuild |

TABLE 2-continued

| TLP Type | Format | Type | Description |
| --- | --- | --- | --- |
| IOWr-Rebuild | 010 | 0 0111 | IO Write Request for a Rebuild |

According to one embodiment, storage controller 204 may further include or be coupled to a RAID engine that uses the disclosed Read/Write-Rebuild opcodes and a priority setting. The RAID engine may be embodied as computer hardware, computer software, or a combination of computer hardware and software (including processing devices and special-purpose processing devices as disclosed herewith). A RAID engine may implement the Read/Write-Rebuild opcodes to have the highest priority. When RAID rebuilding, the RAID engine may execute a function call to a kernel (e.g., of the storage controller 204 or an operating system) to use the Read/Write-Rebuild opcodes. The Read/Write-Rebuild opcodes can be configured or specified in a priority table to have a desired or highest priority. The RAID engine (or storage controller 204) may configure data bandwidth priority to RAID rebuild, as shown in Table 3.

TABLE 3

| Priority | Traffic Class | Opcode |
| --- | --- | --- |
| 1 | 1 | IORd-Rebuild |
| 1 | 1 | IOWr-Rebuild |
| 1 | 1 | MRd-Rebuild |
| 1 | 1 | MWr-Rebuild |
| 0 (Best Effort) | 0 | All Others |

By giving priority to RAID rebuild read and writes, the system may provide a guaranteed bandwidth for RAID rebuild. A guaranteed bandwidth may then translate to a greater accuracy of estimating rebuild time. For example, rebuild can be calculated based on the max data path bandwidth as provided in Table 4. As such, a cloud services provider may accurately predict a guaranteed duration of downtime during drive failure and/or RAID rebuild. The guaranteed downtime duration may then be specified in a sale of SLA (Service Level Agreement).

TABLE 4

| Capacity (TB) | Time (minutes) | Time (seconds) | Transfer Rate (Gb/s) |
| --- | --- | --- | --- |
| 1 | 4 | 250 | 32 |
| 2 | 8 | 500 | 32 |
| 3 | 13 | 750 | 32 |
| 4 | 17 | 1000 | 32 |
| 5 | 21 | 1250 | 32 |
| 6 | 25 | 1500 | 32 |
| 7 | 29 | 1750 | 32 |
| 8 | 33 | 2000 | 32 |

Figure 4:
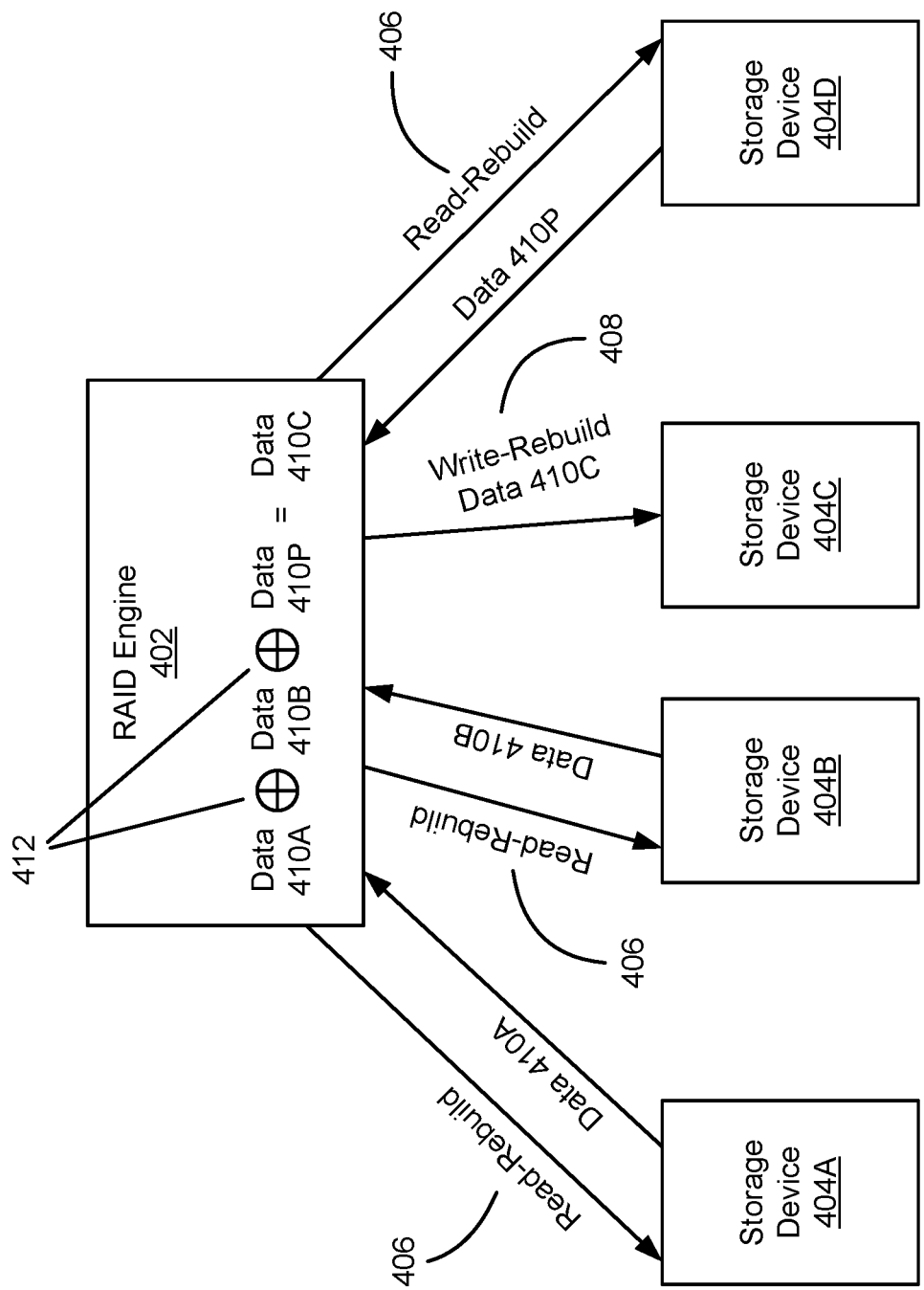
FIG. 4 illustrates a data flow diagram of a disk/drive rebuild according to an embodiment of the present invention.

FIG. 4 illustrates a data flow diagram of a disk/drive rebuild according to an embodiment of the present invention. In the illustrated embodiment, storage system 104 may include a RAID storage system comprising RAID engine 402, storage device 404A, storage device 404B, storage device 404C, and storage device 404D. RAID engine 402 may comprise a centralized device hardware and/or software that performs RAID management tasks and XOR computations for storage devices 404A-404D. Storage devices 404A-404D may include physical storage devices or device slots that may be configured as a single logical storage device. Each of the storage devices 404A-404D may include portions of data within a collective volume that is stored and divided across the storage devices 404A-404D. The RAID engine 402 may facilitate communications with storage devices 404A-404D using TLP packets according to the disclosed Read/Write-Rebuild opcodes and priority settings which prioritize RAID rebuild reads and writes.

Using parity information, the RAID engine 402 may provide fault tolerance when any of storage devices 404A-404D fails. For example, a data request command (e.g., from cloud servers 202) may be executed by the RAID engine 402 to retrieve data from storage device 404C. The RAID engine 402 may retrieve data from storage device 404C and determine if the data has errors based on comparing stored parity information on storage device 404D with calculated parity information of the retrieved RAID data. Data on the failed storage device 404C can be reconstructed with data and parity information from the other storage devices (storage device 404A, storage device 404B, and storage device 404D).

Failure of storage device 404C may cause all or a portion of data 410C to be rebuilt and re-written into a "new" device that is logically recognized as storage device 404C. In certain embodiments, a failed storage device can be checked for integrity and may be either re-formatted and re-used or replaced with another storage device. Data reconstruction may be performed by transferring data and parity from storage device 404A, storage device 404B, and storage device 404D to the RAID engine 402 to perform XOR computation. RAID engine 402 may create rebuilt data by performing an XOR operation on data 410A, 410B, and parity information from data 410P. RAID engine 402 may rebuild the data 410C and store the rebuilt data 410C in storage device 404C.

RAID rebuilding of storage device 404C may including Read-Rebuild 406 and Write-Rebuild 408 operations. In particular, RAID engine 402 may issue Read-Rebuild 406 commands to read data 410A, 410B, and 410P from unfailed storage devices 404A, 404B, and 404D. RAID engine 402 may then perform XOR operation 412 on the read data (data 410A, data 410B, and data 410P) to obtain data 410C stored in corresponding blocks of the storage device 404C (e.g., data 410A XOR data 410B XOR data 410P=data 410C). The RAID storage system may then write the results of the XOR operation (data 410C) into storage device 404C using Write-Rebuild 408 to complete the RAID rebuild.

Figure 5:
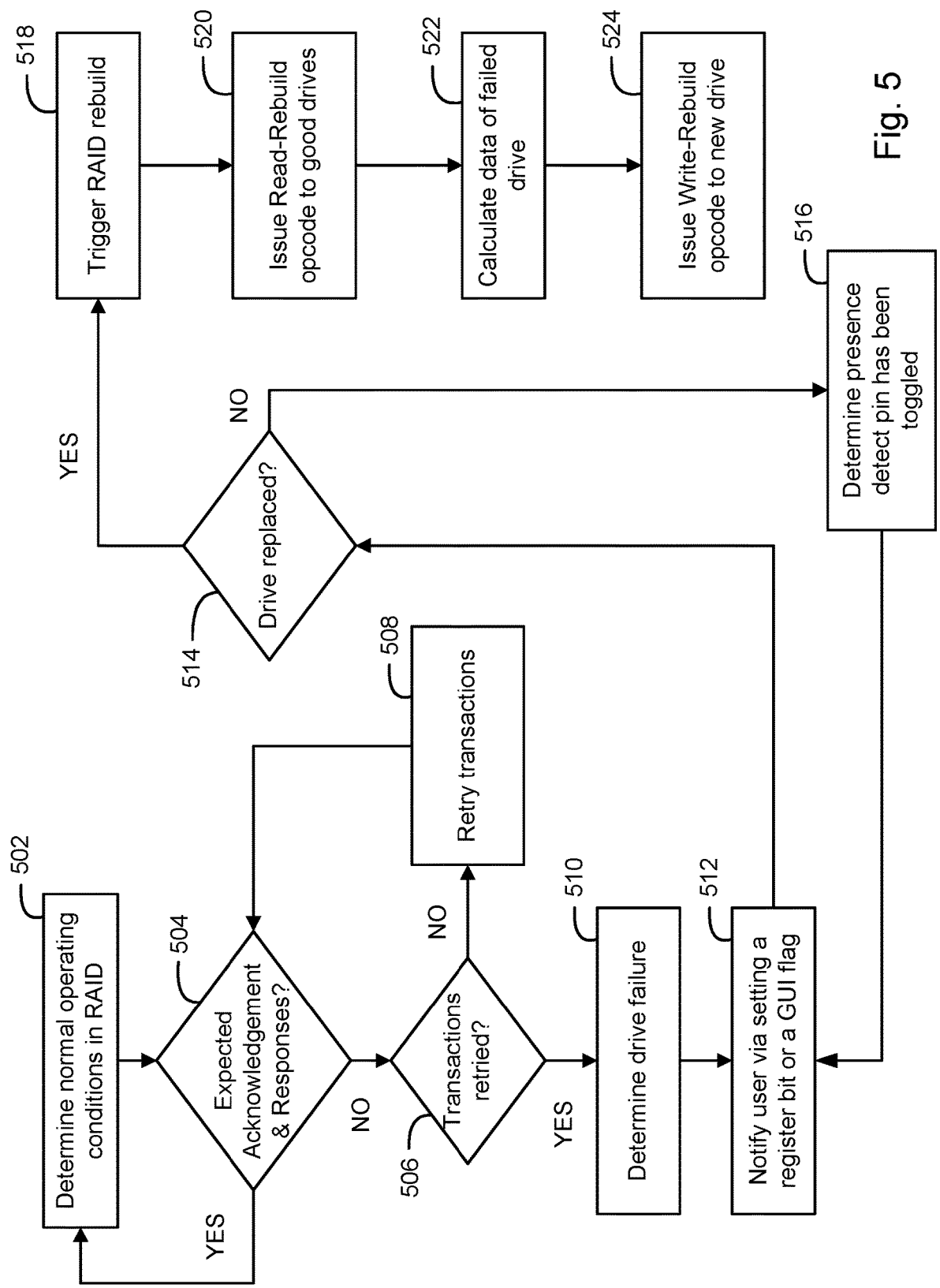
FIG. 5 illustrates a flowchart of a method for detecting and repairing drives in a RAID storage system according to an embodiment of the present invention.

FIG. 5 presents a flowchart of a method for detecting and repairing drives in a RAID storage system according to an embodiment of the present invention. A RAID storage system may include a storage controller or RAID engine that can determine normal operating conditions in the RAID storage system, step 502. Normal operating conditions may be probed by sending transaction requests to each drive of the RAID storage system. The system may determine whether expected acknowledgement and responses are returned by a given one of a plurality of drives, step 504. If expected acknowledgement and responses are returned, the system may return to step 502 and repeat the loop to determine normal operating conditions in RAID at a predetermined interval of time. However, if expected acknowledgement and responses are not received, the system may determine whether the transactions have been retried, step 506. If not, the transactions are retried, step 508.

The system may be configured to retry the transactions a preset number of times. If the system determines that the transactions have been retried a sufficient number of times, drive failure is determined, step 510. A register bit or graphical user interface ("GUI") flag may be set to notify a user (e.g., administrator) of the drive failure, step 512. The system may determine whether the failed drive has been replaced with a new drive, step 514. If not, the system may wait and determine that a presence detect pin at a drive slot has been toggled from 'on' to 'off' and then 'on', which may indicate that a drive has been removed and installed at a drive slot (e.g., PCIe bus), step 516. Another register bit or GUI flag may be set to notify the user of an action corresponding to the toggling of the presence detect pin at step 512 which may then indicate that the drive has been replaced. The system determines that the drive has been replaced and triggers a RAID rebuild, step 518.

Read-Rebuild opcode is issued to read data and parity information from remaining good drives in response to the triggering of the RAID rebuild, step 520. The Read-Rebuild opcode may include a prioritized I/O read request of data from the good drives that takes precedence over "ordinary" I/O read/write requests or any other requests that are not associated with the RAID rebuild. Issuing the Read-Rebuild opcode may also include a corresponding prioritized memory write of the data read from the good drives to memory (e.g., cache on the RAID engine or storage controller) that takes precedence over "ordinary" memory read/write requests or any other request that are not associated with the RAID rebuild. The good drives may include data and parity information that can be used to reconstruct data that was originally stored on the failed drive prior to failure. Data that was stored on the failed drive prior to failure is calculated, step 522. Calculating the data that was stored on the failed drive prior to failure may include the RAID engine or the storage controller calculating a XOR operation on the data and parity information from the good drives and storing the calculated data on memory.

Write-Rebuild opcode is issued to write the calculated data to the new drive, step 524. The Write-Rebuild opcode may include a prioritized I/O write request of the calculated data to the new drive that takes precedence over "ordinary" I/O read/write requests or any other requests that are not associated with the RAID rebuild. Issuing the Write-Rebuild opcode may also include a corresponding prioritized memory read of the calculated data from the memory (of the RAID engine or the storage controller that performed the calculation) that takes precedence over "ordinary" memory read/write requests or any other requests that are not associated with the RAID rebuild. The RAID rebuild may be completed upon writing all of the calculated data to the new drive.

FIGS. 1 through 5 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A method for detecting and repairing drives in a Redundant Array of Independent Disks ("RAID") storage system, the method comprising:
   determining operating conditions of a plurality of drives by sending transaction requests to the plurality of drives;
   identifying an expected acknowledgement and responses that are not returned by a given one of the plurality of drives in response to the transaction requests;
   determining the given one of the plurality of drives has failed based on the identification;
   determining a presence detect pin at a drive slot associated with the failed drive has been toggled;
   determining that the failed drive has been replaced with a new drive based on the toggling of the presence detect pin;
   triggering a RAID rebuild;
   issuing a Read-Rebuild opcode that reads data and parity information from remaining ones of the plurality of drives in response to the RAID rebuild;
   calculating data that was stored on the failed drive prior to failure based on the data and parity information from the remaining ones of the plurality of drives; and
   issuing a Write-Rebuild opcode that writes the calculated data to the new drive.

2. The method of claim 1 wherein the Read-Rebuild opcode further includes a memory read request for the rebuild and the Write-Rebuild opcode further includes memory write request for the rebuild.

3. The method of claim 1 wherein the plurality of drives are configured as a single logical device and includes a volume of data that is stored across the plurality of drives.

4. The method of claim 1 further comprising reconstructing the data stored on the failed drive by performing exclusive or ("XOR") computations on the data and parity information.

5. The method of claim 1 further comprising:
   retrieving data stored on the failed drive from a given one of the plurality of drives; and
   determining that the data stored on the failed drive includes errors based on a comparison with the data and parity information.

6. The method of claim 5 further comprising rebuilding the data stored on the failed drive with the calculated data written to the new drive.

7. The method of claim 1 wherein the remaining ones of the plurality of drives comprise unfailed ones of the plurality of drives.

8. The method of claim 1 wherein the Read-Rebuild opcode includes a prioritized input/output ("I/O") read request of data from the remaining ones of the plurality of drives that takes precedence over I/O read and write requests that are not associated with the RAID rebuild.

9. The method of claim 1 wherein the Read-Rebuild opcode includes a prioritized memory write of the data read from good drives of the plurality of drives to memory that takes precedence over memory read and write requests that are not associated with the RAID rebuild.

10. The method of claim 1 wherein the Write-Rebuild opcode includes a prioritized I/O write request of the calculated data to the new drive that takes precedence over I/O read and write requests that are not associated with the RAID rebuild.

11. The method of claim 1 wherein the Write-Rebuild opcode includes a prioritized memory read of the calculated data that takes precedence over memory read and write requests that are not associated with the RAID rebuild.

12. The method of claim 1 further comprising setting a register bit or a graphical user interface flag that notifies a user that the given one of the plurality of drives has failed.

13. A method for detecting and repairing drives in a Redundant Array of Independent Disks ("RAID") storage system, the method comprising:
   determining operating conditions of a plurality of drives by sending transaction requests to the plurality of drives;
   identifying an expected acknowledgement and responses that are not returned by a given one of the plurality of drives in response to the transaction requests;
   determining the given one of the plurality of drives has failed based on the identification;
   determining a presence detect pin at a drive slot associated with the failed drive has been toggled;

setting a register bit or a graphical user interface flag that notifies a user that the presence detect pin has been toggled;

determining that the failed drive has been replaced with a new drive based on the toggling of the presence detect pin;

triggering a RAID rebuild;

issuing a Read-Rebuild opcode that reads data and parity information from remaining ones of the plurality of drives in response to the RAID rebuild;

calculating data that was stored on the failed drive prior to failure based on the data and parity information from the remaining ones of the plurality of drives; and issuing a Write-Rebuild opcode that writes the calculated data to the new drive.

14. The method of claim 13 wherein calculating the data includes calculating an exclusive or ("XOR") operation on the data and parity information from the remaining ones of the plurality of drives.

15. The method of claim 13 further comprising retrying the transaction requests a preset number of times.

16. The method of claim 13 further comprising setting a register bit or a graphical user interface flag that notifies a user that the given one of the plurality of drives has failed.

17. The method of claim 13 wherein the Read-Rebuild opcode includes a prioritized input/output ("I/O") read request of data from the remaining ones of the plurality of drives that takes precedence over I/O read and write requests that are not associated with the RAID rebuild.

18. The method of claim 13 wherein the Read-Rebuild opcode includes a prioritized memory write of the data read from good drives of the plurality of drives to memory that takes precedence over memory read and write requests that are not associated with the RAID rebuild.

19. The method of claim 13 wherein the Write-Rebuild opcode includes a prioritized I/O write request of the calculated data to the new drive that takes precedence over I/O read and write requests that are not associated with the RAID rebuild.

20. The method of claim 13 wherein the Write-Rebuild opcode includes a prioritized memory read of the calculated data that takes precedence over memory read and write requests that are not associated with the RAID rebuild.

\* \* \* \* \*